Jan. 8, 1952        M. ARRIGO        2,581,619
VEHICLE WHEEL CHOCK
Filed Aug. 30, 1950        2 SHEETS—SHEET 1
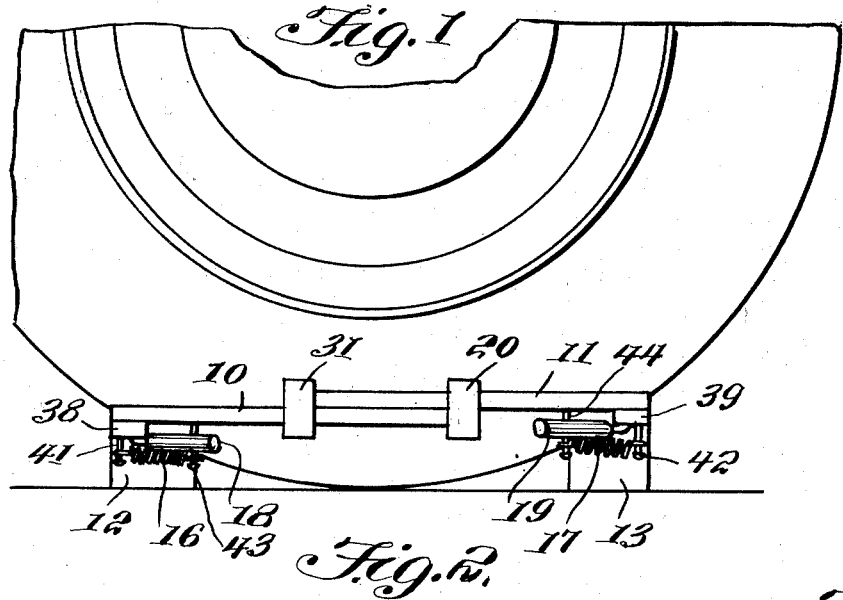
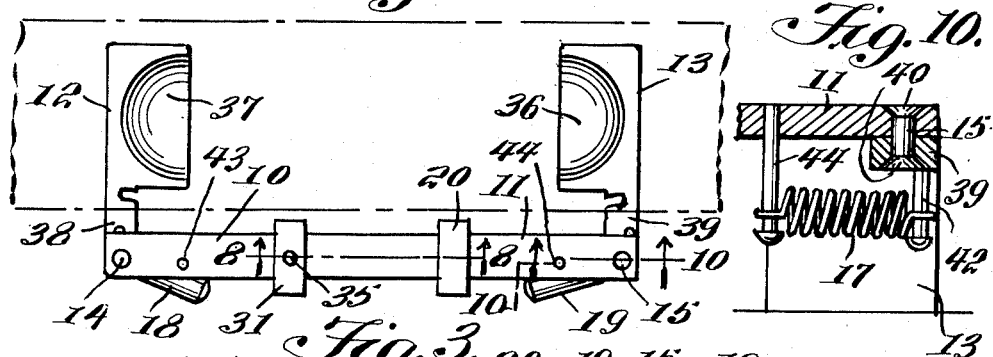
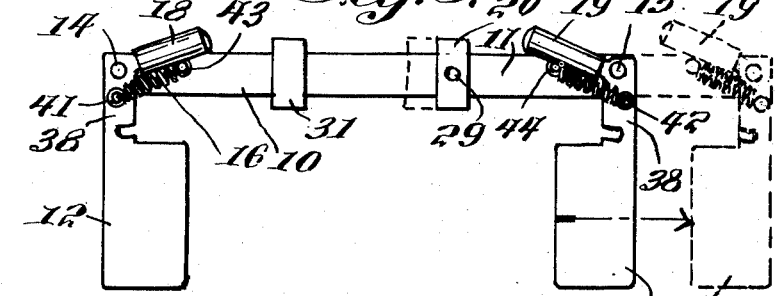
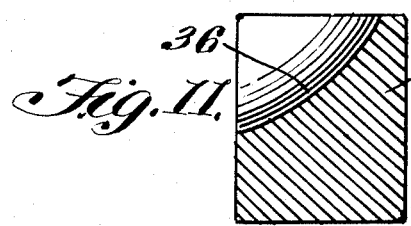
INVENTOR.
Mike Arrigo,
BY Victor J. Evans & Co.
ATTORNEYS Jan. 8, 1952 M. ARRIGO 2,581,619
VEHICLE WHEEL CHOCK
Filed Aug. 30, 1950 2 SHEETS—SHEET 2
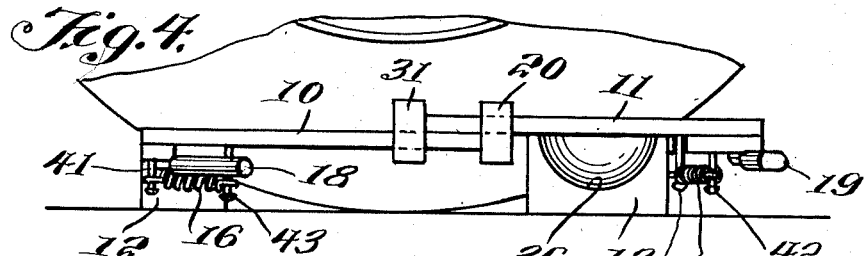
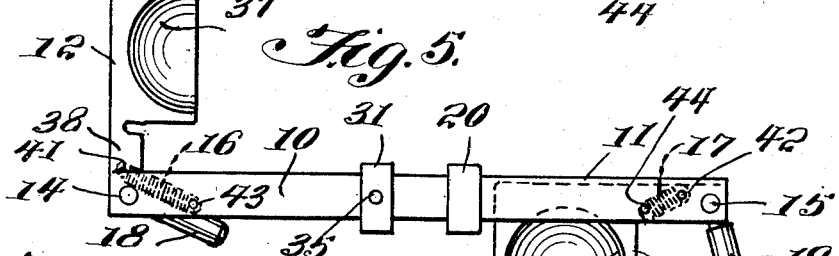
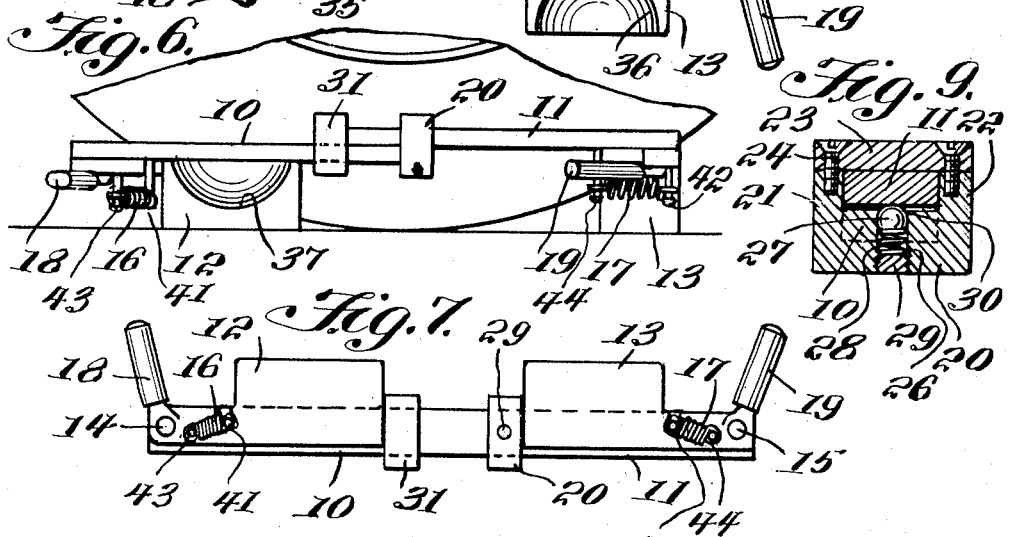
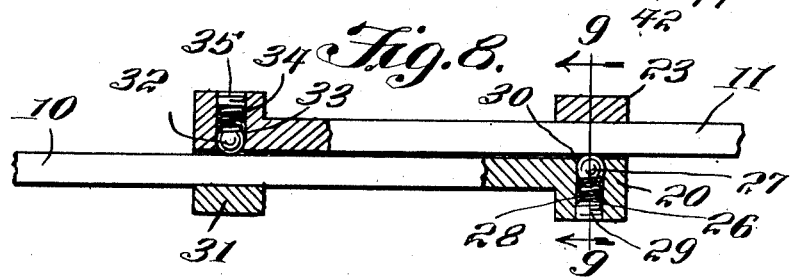
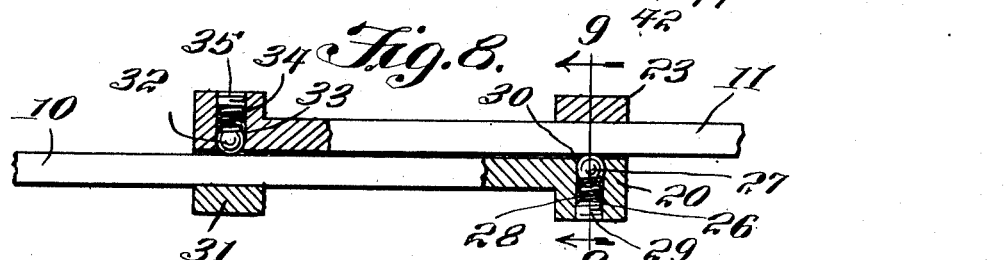
INVENTOR.
Mike Arrigo,
BY Victor J. Evans & Co.
ATTORNEYS Patented Jan. 8, 1952

2,581,619

UNITED STATES PATENT OFFICE 2,581,619

VEHICLE WHEEL CHOCK

Mike Arrigo, Pueblo, Colo.

Application August 30, 1950, Serial No. 182,373

3 Claims. (Cl. 188—32)

This invention relates to blocks and devices used for preventing wheels and particularly motor vehicle wheels rolling while changing a tire or while working upon the vehicle, and in particular this invention relates to a chock having oppositely positioned wheel blocks pivotally mounted on the ends of slidably mounted bars which provide an extensible member for connecting the blocks.

The purpose of this invention is to provide a device that may readily be applied to a wheel of a vehicle to prevent the wheel rolling in either direction.

Various types of devices have been used against wheels of motor vehicles to prevent the wheel rolling but because wheels are provided in numerous sizes it has been found difficult to design a device for universal use. With this thought in mind this invention contemplates a pair of blocks with arcuate recesses in opposed faces with the blocks pivotally mounted on bars and with the bars slidably connected whereby the distance between the blocks is adjustable.

The object of this invention is, therefore, to provide means for constructing a wheel chock having a pair of spaced wheel holding blocks whereby the distance between the blocks is adjustable.

Another object of the invention is to provide a safety vehicle wheel holding chock in which the parts are collapsible.

Another object of the invention is to provide means for mounting a pair of spaced wheel holding blocks on slidably connected bars whereby the blocks are urged to folded positions below the bars when released.

A further object of the invention is to provide a collapsible motor vehicle wheel safety chock having blocks pivotally mounted on the ends of slidably connected bars which is of a simple and economical construction.

Other features and advantages of the invention will appear from the following description taken in connection with the drawings wherein:

Figure 1 is a side elevational view showing the improved safety chock in the position of holding a motor vehicle wheel.

Figure 2 is a plan view of the chock showing the wheel holding blocks extended and showing a tire positioned over the blocks in dotted lines.

Figure 3 is a view looking upwardly toward the under side of the safety chock with a block at one end of the device shown in the extended position in dotted lines.

Figure 4 is a side elevational view similar to that shown in Figure 1 showing the block at one end of the device folded.

Figure 5 is a plan view similar to that shown in Figure 2 showing the parts in the positions as shown in Figure 4.

Figure 6 is a side elevational view similar to that shown in Figure 4 showing the block at the opposite end of the device folded.

Figure 7 is a view looking upwardly toward the under side of the device, similar to Figure 3 showing both of the blocks in the folded position.

Figure 8 is a longitudinal section in part taken on line 8—8 of Figure 2 showing spring loaded balls for frictionally holding the parts to provide adjustment therein.

Figure 9 is a cross section taken on line 9—9 of Figure 8 illustrating one of the slidable connecting units.

Figure 10 is a section taken on line 10—10 of Figure 2 showing one of the springs for urging the blocks to the closed positions.

Figure 11 is a cross section through one of the blocks showing the arcuate wheel receiving recess therein.

Referring now to the drawings wherein like reference characters denote corresponding parts the improved chock of this invention includes a pair of bars 10 and 11 with wheel holding blocks 12 and 13 pivotally mounted on the ends of the bars, respectively, by pins 14 and 15, and the blocks which are resiliently held in folded positions by springs 16 and 17, are provided with handles 18 and 19, respectively.

As illustrated in Figures 8 and 9 the bar 10 is provided with a collar 20 having upwardly extended arms 21 and 22 to the upper ends of which the bar 23 is secured by screws 24 and 25. By this means a slot is provided in the upper part of the collar in which the bar 11 is slidably mounted. The collar 20 is provided with an opening 26 that extends through the bar 10 and a ball 27 is resiliently held in the upper end of the opening by a spring 28 which is held in the opening by a threaded plug 29. The inner end of the opening 26, which corresponds with the upper surface of the bar 10 is peaned at the point 30 to limit outward movement of the ball.

A similar collar 31 is provided on the end of the bar 11 and a ball 32 is resiliently held in an opening 33 by a spring 34 with a plug 35 threaded in the outer end of the opening. By this means the bars are frictionally held whereby the bars may be extended or contracted to correspond with the size of a wheel upon which the device is used.

As illustrated in Figures 1 and 4 the block 13 is of a greater thickness than the block 12 to compensate for the thickness of the bar 10 and, as shown, the block 13 is provided with an arcuate recess 36 which is shaped to receive the outer surface of a tire, wheel, or the like. The block 12 is provided with a similar recess 37. The blocks are provided with extended shanks 38 and 39, respectively and the pins 14 and 15, which are provided with enlarged ends 40, as shown in Figure 10 extend through the bars and shanks of the blocks.

As illustrated in Figure 3 the springs 16 and 17 are, respectively, attached to pins 41 and 42 on the shanks of the blocks 12 and 13, and also to pins 43 and 44 which extend downwardly from the bars 10 and 11, respectively. The handles 18 and 19 are integral with and extend outwardly from the ends of the shanks of the blocks.

With the parts arranged in this manner the blocks 12 and 13 may be actuated by gripping the handles 18 and 19, and by forcing the handles inwardly the blocks may be opened to the position shown in Figure 2 whereby the device may be positioned under a tire or wheel, as illustrated in Figure 1. Upon release of the handles the blocks will be urged against the surface of the wheel or tire and by sliding one bar in relation to another the blocks may be adjusted to receive a tire or wheel of a size within certain limits.

It will be understood that modifications may be made in the design and arrangement of the parts without departing from the spirit of the invention.

What is claimed is:

1. In a wheel chock, the combination which comprises a bar, solid wheel engaging blocks having wheel receiving recesses in opposed faces thereof with the blocks extended pivotally mounted on the ends of the bar, means adjusting the length of the bar, resilient means urging the blocks to folded positions below the bar, and handles extended from the pivotally mounted ends of the blocks for holding the blocks in extended positions by hand.

2. In a wheel chock, the combination which comprises a pair of bars having collars on the inner ends with the collar of one bar surrounding the other bar providing slidable mounting means of one bar in relation to the other, solid wheel holding blocks with wheel receiving recesses in opposed faces thereof extended perpendicularly from the ends of the bars, means pivotally attaching the blocks to the ends of the bars, handles carried by the blocks and extended from the end of the bars with the blocks in folded positions below the bars, and springs attached, at one of the ends thereof to the blocks, and at the other of the ends to the bars, respectively for urging the blocks to folded positions in relation to the bars.

3. In a wheel chock, the combination which comprises a pair of bars having collars on the inner ends with the collar of one bar surrounding the other bar providing slidable mounting means of one bar in relation to the other, wheel holding blocks extended perpendicularly from the ends of the bars, means pivotally attaching the blocks to the ends of the bars, handles extended from the blocks, springs attached, at one of the ends thereof to the blocks, and at the other of the ends to the bars, respectively for urging the blocks to folded positions in relation to the bars, and spring loaded balls in the said collars for resiliently holding the bars in assembled relation.

MIKE ARRIGO.

REFERENCES CITED

The following references are of record in the file of this patent:

UNITED STATES PATENTS

| Number | Name | Date |
| --- | --- | --- |
| 2,475,111 | Ridland | July 5, 1949 |
| 2,491,989 | Lind | Dec. 20, 1949 |
| 2,517,673 | Johnson | Aug. 8, 1950 |